Dec. 22, 1942.                M. BALZ                2,305,802
VEHICLE WHEEL SUSPENSION
Filed Sept. 18, 1939
Fig. 1.
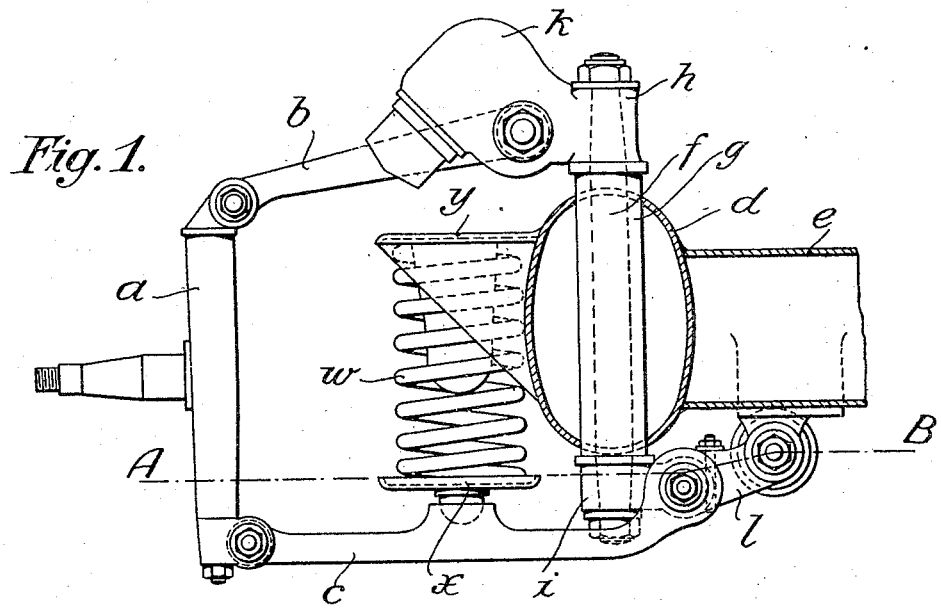
Fig. 2.
Fig. 3.
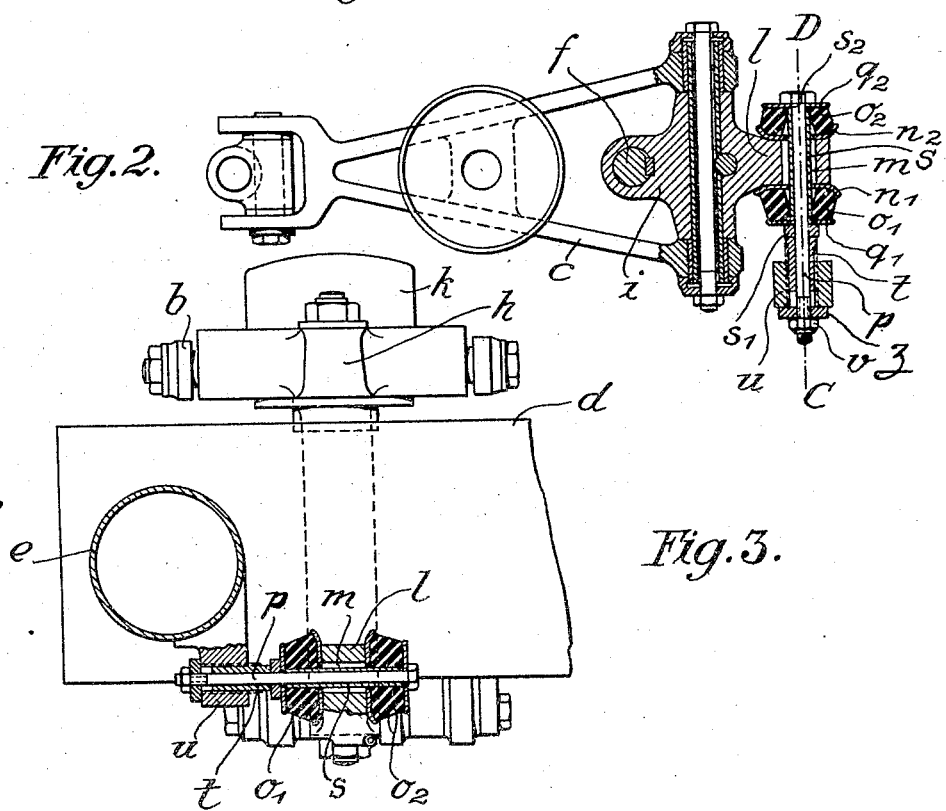
INVENTOR
Max Balz
BY
ATTORNEY Patented Dec. 22, 1942

2,305,802

UNITED STATES PATENT OFFICE 2,305,802

VEHICLE WHEEL SUSPENSION

Max Balz, Esslingen-on-the-Nekar, Germany; vested in the Alien Property Custodian Application September 18, 1939, Serial No. 295,483
In Germany September 17, 1938

7 Claims. (Cl. 267—20)

(Granted under the provisions of sec. 14, act of
March 2, 1927; 357 O. G. 5)

This invention relates to improved vehicle wheel suspensions and is concerned with suspensions wherein wheel guidance means controlling up and down movements are mounted on a vertical pivot device which is capable of turning, but only against the resistance of resilient abutments. In particular, the invention is concerned with wheel suspensions comprising shock absorbers of the kind described and claimed in the concurrent U. S. A. patent application Serial No. 295,185, by Max Wagner, filed September 16, 1939.

Wheel guidance means for controlling up and down movements of a wheel carrier may comprise either link quadrangles, half axles, or transverse spring supports. One object of the invention is to provide for the resilient abutments which are operative for resisting turning of the vertical pivot device, to be initially stressed by adjustable means.

A further object is to provide an adjustment for altering the normal angular position of rest of the vertical pivot device and to make this adjustment effective through the resilient abutments, such as rubber cushions, mounted on the chassis.

In effect, the invention aims at compensating readily for any inaccuracies in manufacture and assembly, so that road wheels, suspended in the manner aforesaid, may be accurately adjusted to a prescribed position.

A particular object is to provide a mounting bolt for the rubber cushions, which bolt penetrates the cushions and carries means for initially stressing them and enables the adjustment aforesaid to be performed.

Preferably, the vertical pivot device has a single arm for engaging the resilient abutments which are arranged on each side thereof, and the aforesaid bolt device penetrates both the resilient abutments and the arm and is mounted on the chassis on one or both sides of the abutments or cushions.

The bolt device may have a one-sided mounting on a transverse member of the chassis and may be offset in the longitudinal direction of the vehicle in relation to the vertical pivot device or the wheel guidance means mounted thereon. This may be advantageous for reasons of space, as for example when there is a forward displacement of the transverse bearers.

One embodiment of the invention is illustrated by way of example in the annexed drawing, wherein—

Figure 1 is a front sectional elevation of an improved vehicle wheel suspension;

Figure 2 is a plan section on the line A—B of Figure 1; and

Figure 3 is a side elevation comprising a vertical section taken on the line C—D of Figure 2.

In the arrangement seen in Figure 1, a wheel carrier $a$ is guidingly suspended from the chassis by means of parallelogram links $bc$. The chassis comprises a longitudinal bearer $d$ and a transverse bearer $e$, and a vertical pivot $f$ mounted in a bushing $g$ penetrating the longitudinal bearer $d$ is provided for the mounting of the links $bc$ on the chassis. For this purpose, hinge joint members $h$ and $i$ are fixedly connected to the upper and lower ends of the pivot $f$ and the links are hingedly connected to such members.

The upper joint member $h$ is constructed to serve as the housing of a shock absorber $k$ and the lower joint member $i$ has an inwardly directed arm $l$ which engages between resilient abutment stops on the frame for the purpose of resisting turning of the pivot $f$.

The suspension, moreover, comprises a coil spring $w$ operating against the lower link $c$ through the medium of an abutment plate $x$ and a ball joint, the upper end of the spring $w$ pressing against a fixed abutment bracket $y$ on the bearer $d$.

The suspension so far described will be found to be described in detail as regards its construction and purpose in the concurrent U. S. A. patent application, Serial No. 295,185, aforesaid.

Referring now to Figures 2 and 3, it will be seen that the arm $l$ is formed with a perforation $m$ and abuts at each side, through the intermediary of dished discs $n_1$ $n_2$ against rubber cushions $o_1$ and $o_2$. The latter, in turn, abut through the intermediary of discs $q_1$ $q_2$ against rigid abutments $s_1$ $s_2$ carried by a bolt $p$ supported on the frame as hereinafter described, the said bolt $p$ passing through central holes in the discs $n_1$ $n_2$ and $q_1$ $q_2$ and the cushions $o_1$ $o_2$ and through the perforation $m$ in the arm $l$.

The abutment $s_2$ may be a fixed head on the bolt $p$, as shown, but the abutment $s_1$ is a sleeve which is displaceable along the bolt. This abutment sleeve $s_1$ is screwed into a hole in a bracket $u$ depending from the transverse bearer $e$ of the chassis, its external screw threading being indicated at $t$. The screw threaded end of the bolt $p$ extending from the sleeve $s_1$ beyond the bracket $u$ receives a nut $z$ and lock nut $v$ which are screwed up against the bracket $u$. Thus, it will be seen that the bolt $p$ is supported by the abutment sleeve $s_1$ in the bracket $u$ and is held in endwise position by the nut $z$, and lock nut $v$ which also prevent the bolt $p$ from turning.

When the bolt $p$ and its assemblage of parts has been mounted, it is possible to apply predetermined initial compressive stress to the cushions $o_1$, $o_2$ by screw adjustment of the abutment sleeve $s_1$ along the bolt. The amount of such initial stress may be limited by the use of an intermediate bushing $s$ on the bolt $p$. This stress in the said cushions prevents unintentional loosening of the adjustment means. However, separate safety means for preventing unscrewing of the sleeve $s_1$ may be provided.

For adjusting the angular position of rest of the pivot $f$ and therefore the horizontal angular position of the whole wheel suspension, the bolt $p$ is adjusted lengthwise by screwing of the nut and lock nut $v$ and, for each such adjustment, the abutment sleeve $s_1$ may be further adjusted for applying or maintaining a predetermined initial stress in the rubber cushions $o_1$, $o_2$. If desired, other safety means may be applied for preventing unintentional turning of the adjustment nut at $v$.

It will now be seen that a simple, effective and reliable means has been provided for giving with accuracy a desired horizontal angular setting of the wheel suspension by fine adjustment about the axis of the vertical pivot $f$.

The terms "frame" or "chassis" as used throughout the specification and claims are to be understood as not limited solely to such frames or chassis separate from the body of the vehicle, but to include constructions wherein such frame or chassis form an integral part of the vehicle body, such as in the so-called "frameless" vehicles.

It will be seen that I have provided a construction which satisfies the objects enumerated above, and one which constitutes a valuable advance in the art. While I have shown the invention in a certain physical embodiment, it is to be understood that modifications of the structure shown may be made by those skilled in this art without departing from my invention as expressed in the claims which follow.

I claim:

1. In a vehicle having a frame including a transverse beam, a wheel suspension comprising a wheel carrier, supporting links therefor, a vertical pivot hingedly supporting said links on the chassis, an abutment arm extending from said pivot, resilient cushions engaging opposite sides of said abutment arm, a bolt freely penetrating said cushions and said abutment arm, an adjustable mounting for said bolt on said transverse beam to one side of said cushions, and adjustment means on said bolt operative for compressively stressing said cushions.

2. In a vehicle wheel suspension wherein a linkage supporting the wheel carrier is hingedly supported by a vertical pivot mounted in the chassis and restrained against turning by resilient cushions engaging opposite sides of an abutment arm extending from said pivot, the combination with said arm of a mounting bolt for said cushions, adjustable means on said bolt operative for the endwise fixing of said bolt relative to said chassis, and a screw adjustment operative in said chassis for variably stressing said cushions.

3. In a vehicle having a frame including longitudinal and transverse beams, a wheel suspension including a supporting member and means for journaling the same about a substantially perpendicular axis on said longitudinal beam in a transverse plane displaced from the transverse beam, an abutting arm on said supporting member, two elastic buffers, one positioned on each side of said abutting arm for elastically resisting movement of said supporting member about its perpendicular axis, an extension on said transverse beam at one side of said abutting arm, said abutting arm, elastic buffers and beam extension having aligned holes, a bolt extending through all of said holes, means for axially positioning said buffers upon said bolt, and means for adjustably attaching said bolt to said beam extension.

4. The combination according to claim 3, in which the means for axially positioning said buffers upon said bolt comprise a first abutment on the extreme end of the bolt lying against the outer elastic buffer, as measured from the beam extension, and a second abutment threaded in the hole in said beam extension, surrounding said bolt and lying against the near elastic buffer, and the means for adjustably attaching said bolt to said beam extension includes a nut threaded upon the end of the bolt extending through the hole in the beam extension, and abutting against said beam extension.

5. In a vehicle having a frame, a wheel suspension including a supporting member and means for journaling the same about a substantially perpendicular axis on said frame, an abutting arm on said supporting member, two elastic buffers, one positioned at each side of said abutting arm for elastically resisting movement of said supporting member about its perpendicular axis, an extension on said frame at one side of said abutting arm, said abutting arm, elastic buffers and frame extension having aligned holes, a bolt extending through all of said holes, means for axially positioning said buffers upon said bolt, and means for adjustably attaching said bolt to said frame extension.

6. The combination according to claim 5, in which the means for axially positioning said buffers upon said bolt comprises a first abutment on the extreme end of the bolt lying against the outer elastic buffer, as measured from the frame extension, and a second abutment threaded in the hole in said frame extension, surrounding said bolt and lying against the near elastic buffer, and the means for adjustably attaching said bolt to said frame extension includes a nut threaded upon the end of the bolt extending through the hole in the frame extension, and abutting against said frame.

7. In a vehicle having a frame, a wheel carrier, linkage means connected to said carrier, a vertical pivot pin rotatably mounted on said frame, to which said linkage means are pivotally connected, an abutment arm connected for rotation with said pivot pin, resilient cushions engaging opposite sides of said abutment arm, a frame extension positioned longitudinally at one side of said cushions, a bolt longitudinally adjustable relatively to said frame extension, mounted with one end in said frame extension and supporting said resilient cushions against said arm on its other end, and means on said bolt for adjusting the initial setting of said resilient cushions.

MAX BALZ.